(12) United States Patent
Chen et al.

(10) Patent No.: US 12,401,064 B2
(45) Date of Patent: *Aug. 26, 2025

(54) ELECTROLYTE COMPRISING NONAQUEOUS SOLVENT AND LITHIUM SALT

(71) Applicant: CONTEMPORARY AMPEREX TECHNOLOGY (HONG KONG) LIMITED, Hong Kong (CN)

(72) Inventors: Peipei Chen, Ningde (CN); Chenghua Fu, Ningde (CN); Junmin Feng, Ningde (CN); Chengdu Liang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 999 days.

This patent is subject to a terminal disclaimer.

(21) Appl. No.: 17/199,265

(22) Filed: Mar. 11, 2021

(65) Prior Publication Data

US 2021/0203001 A1    Jul. 1, 2021

Related U.S. Application Data

(63) Continuation of application No. PCT/CN2019/108599, filed on Sep. 27, 2019.

(30) Foreign Application Priority Data

Sep. 28, 2018 (CN) .......................... 201811141730.8

(51) Int. Cl.
*H01M 10/0569* (2010.01)
*H01M 4/505* (2010.01)
(Continued)

(52) U.S. Cl.
CPC ....... *H01M 10/0569* (2013.01); *H01M 4/525* (2013.01); *H01M 10/0525* (2013.01);
(Continued)

(58) Field of Classification Search
CPC ......... H01M 10/0568; H01M 10/0569; H01M 2300/0037; H01M 2300/004; H01M 2300/0028
See application file for complete search history.

(56) References Cited

U.S. PATENT DOCUMENTS

| | | | |
|---|---|---|---|
| 2001/0009744 A1 | 7/2001 | Kim et al. | |
| 2004/0106047 A1* | 6/2004 | Mie .................. | H01M 10/0567 |
| | | | 429/324 |

(Continued)

FOREIGN PATENT DOCUMENTS

| | | |
|---|---|---|
| CN | 1497765 A | 5/2004 |
| CN | 1540793 A | 10/2004 |

(Continued)

OTHER PUBLICATIONS

Contemporary Amperex Technology Co Limited, International Search Report and Written Opinion, PCT/CN2019/108599, Dec. 27, 2019, 18 pgs.

(Continued)

*Primary Examiner* — Imran Akram
(74) *Attorney, Agent, or Firm* — K&L Gates LLP

(57) ABSTRACT

This application provides a nonaqueous electrolyte, a lithium-ion battery, a battery module, a battery pack, and an apparatus. The nonaqueous solvent includes a nonaqueous solvent and a lithium slat. The nonaqueous solvent includes a carbonate solvent and a high oxidation potential solvent, the lithium salt is a mixed lithium salt formed by LiPF$_6$ and LiN(FSO$_2$)$_2$, and the high oxidation potential solvent is (Continued)

selected from one or more of compounds represented by formula I and formula II. This application can not only improve electrochemical performance of the lithium-ion battery under high temperature and high voltage and improve safety performance such as overcharge safety and hot box safety of the lithium-ion battery, but also ensure that the lithium-ion battery has some kinetic performance.

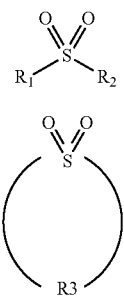

Formula I

Formula II

20 Claims, 4 Drawing Sheets

(51) Int. Cl.
    *H01M 4/525*     (2010.01)
    *H01M 10/0525*     (2010.01)
    *H01M 10/0567*     (2010.01)

(52) U.S. Cl.
    CPC ........ *H01M 10/0567* (2013.01); *H01M 4/505* (2013.01); *H01M 2220/20* (2013.01); *H01M 2300/0034* (2013.01); *H01M 2300/0037* (2013.01)

(56) References Cited

U.S. PATENT DOCUMENTS

| | | |
|---|---|---|
| 2012/0258357 A1 | 10/2012 | Kim |
| 2017/0040639 A1* | 2/2017 | Wang ................ H01M 10/0569 |
| 2019/0393554 A1 | 12/2019 | Noguchi et al. |
| 2020/0028212 A1 | 1/2020 | Hirakawa et al. |

FOREIGN PATENT DOCUMENTS

| | | |
|---|---|---|
| CN | 101351858 A | 1/2009 |
| CN | 102790236 A | 11/2012 |
| CN | 103441304 A | 12/2013 |
| CN | 103500849 A | 1/2014 |
| CN | 104900916 A | 9/2015 |
| CN | 105655644 A | 6/2016 |
| CN | 105870505 A | 8/2016 |
| CN | 106252715 A | 12/2016 |
| CN | 107359369 A | 11/2017 |
| CN | 107611479 A | 1/2018 |
| CN | 107887645 A | 4/2018 |
| JP | 2013051342 A | 3/2013 |
| JP | 2015149250 A | 8/2015 |
| WO | WO2014080870 | 5/2014 |
| WO | WO2018101391 | 6/2018 |
| WO | WO-2018101391 A1 * | 6/2018 ........ H01M 10/0525 |
| WO | WO2018168285 | 9/2018 |

OTHER PUBLICATIONS

Contemporary Amperex Technology Co Limited, Extended European Search Report, EP19867877.3, Jul. 1, 2021, 5 pgs.
Ningder Age New Energy Technology Co., Ltd., First Office Action, CN201811141730.8, Sep. 3, 2020, 16 pgs.
Ningder Age New Energy Technology Co., Ltd., Third Office Action, CN201811141730.8, Mar. 26, 2021, 11 pgs.
Ningder Age New Energy Technology Co., Ltd., Fourth Office Action, CN201811141730.8, Jun. 21, 2021, 13 pgs.

* cited by examiner

ELECTROLYTE COMPRISING NONAQUEOUS SOLVENT AND LITHIUM SALT

CROSS-REFERENCE TO RELATED APPLICATIONS

This application is a continuation application of PCT Patent Application No. PCT/CN2019/108599, entitled "NONAQUEOUS ELECTROLYTE, LITHIUM-ION BATTERY, BATTERY MODULE, BATTERY PACK, AND APPARATUS" filed on Sep. 27, 2019, which claims priority to Chinese Patent Application No. 201811141730.8, filed with China National Intellectual Property Administration on Sep. 28, 2018 and entitled "NONAQUEOUS ELECTROLYTE AND LITHIUM-ION BATTERY", both of which are incorporated herein by reference in their entirety.

TECHNICAL FIELD

This application relates to the field of batteries, and in particular, to a nonaqueous electrolyte, a lithium-ion battery, a battery module, a battery pack, and an apparatus.

BACKGROUND

Lithium-ion batteries are widely applied to electromobiles and consumer electronic products due to their advantages such as a high energy density, high output power, long cycle life, and low environmental pollution. Current requirements for lithium-ion batteries are high voltage, high power, long cycle life, long storage life, and superb safety performance.

At present, nonaqueous electrolyte systems that use lithium hexafluorophosphate as a conductive lithium salt and cyclic carbonate and/or linear carbonate as a solvent are widely applied in lithium-ion batteries. However, the above nonaqueous electrolytes still have many shortcomings. For example, in a high-voltage system, cycle performance, storage performance, and safety performance of the above nonaqueous electrolytes need to be improved. For another example, in a lithium cobalt oxide or high nickel ternary system, safety performance such as overcharge safety and hot box safety of lithium-ion batteries needs to be improved.

SUMMARY

In view of the problems in the Background, this application is intended to provide a nonaqueous electrolyte, a lithium-ion battery, a battery module, a battery pack and an apparatus. The nonaqueous electrolyte can not only improve electrochemical performance of the lithium-ion battery under high temperature and high voltage and improve safety performance such as overcharge safety and hot box safety of the lithium-ion battery, but also ensure that the lithium-ion battery has some kinetic performance.

To achieve the foregoing objective, according to a first aspect of this application, this application provides a nonaqueous electrolyte, including a nonaqueous solvent and a lithium salt. The nonaqueous solvent includes a carbonate solvent and a high oxidation potential solvent, the lithium salt is a mixed lithium salt formed by $LiPF_6$ and $LiN(FSO_2)_2$, and the high oxidation potential solvent is selected from one or more of compounds represented by formula I and formula II.

In formula I, $R_1$ and $R_2$ are independently selected from unsubstituted, partially halogenated, or fully halogenated alkyl groups having 1 to 5 carbon atoms, and at least one of $R_1$ and $R_2$ is a partially halogenated or fully halogenated alkyl group having 1 to 5 carbon atoms. In formula II, $R_3$ is selected from partially halogenated or fully halogenated alkylidene groups having 1 to 6 carbon atoms. In $R_1$, $R_2$, $R_3$, a halogen atom is selected from one or more of F, Cl, Br, and I.

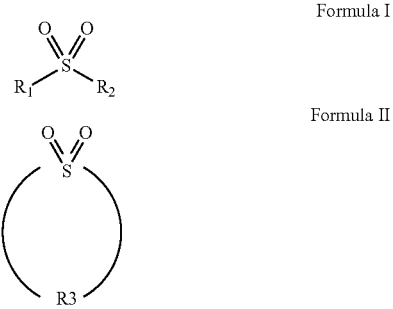

Formula I

Formula II

According to a second aspect of this application, this application provides a lithium-ion battery, including a positive electrode plate, a negative electrode plate, a separator, and the nonaqueous electrolyte according to the first aspect of this application.

According to a third aspect of this application, a battery module is provided, including the lithium-ion battery according to the second aspect of this application.

According to a fourth aspect of this application, a battery pack is provided, including the battery module according to the third aspect of this application.

According to a fifth aspect of this application, an apparatus is provided, including the lithium-ion battery according to the second aspect of this application, where the lithium-ion battery is used as a power supply of the apparatus.

Compared with the prior art, this application includes at least the following beneficial effects:

(1) The nonaqueous electrolyte in this application can combine advantages of high oxidation resistance and non-flammability of the high oxidation potential solvent with advantages of low viscosity and a high dielectric constant of the carbonate solvent. As such, the nonaqueous electrolyte can not only improve electrochemical performance of the lithium-ion battery under high temperature and high voltage, but also ensure that the lithium-ion battery has some kinetic performance.

(2) As the nonaqueous electrolyte in this application uses a mixed solvent formed by a high oxidation potential solvent and a carbonate solvent, the nonaqueous electrolyte can overcome disadvantages of conventional carbonate solvents, such as poor oxidation resistance, easy high-pressure decomposition and gas generation, a low flash point, and easy combustion, and can greatly improve safety performance such as overcharge safety and hot box safety of the lithium-ion battery.

(3) The nonaqueous electrolyte of this application uses a mixed lithium salt formed by $LiPF_6$ and LiFSI. LiFSI has advantages of moderate viscosity and a high degree of dissociation, and can facilitate ion conduction and improve electrical conductivity of the nonaqueous electrolyte. Therefore, use of the mixed lithium salt may effectively make up for low electrical conductivity of the nonaqueous electrolyte caused by high viscosity of the high oxidation potential solvent, and helps to obtain a lithium-ion battery with good kinetics performance.

The battery module, the battery pack, and the apparatus in this application include the lithium-ion battery, and therefore have at least the same advantages as the lithium-ion battery.

The battery module, the battery pack, and the apparatus in this application include the lithium-ion battery, and therefore have at least the same advantages as the lithium-ion battery.

Figure 1:
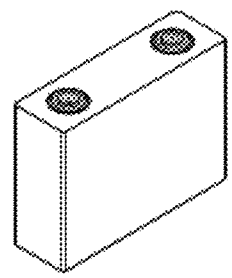
FIG. 1 is a perspective view of an embodiment of a lithium-ion battery.

Reference signs are described as follows:
1. battery pack;
    2. upper box body;
    3. lower box body;
    4. battery module;
        5. lithium-ion battery;
            51. housing;
            52. electrode assembly;
                521. first electrode plate;
                    521a. first current collector;
                    521b. first active material layer;
                522. second electrode plate;
                    522a. second current collector;
                    522b. second active material layer;
                523. separator;
                524. first tab;
                525. second tab; and
            53. top cover assembly.

DESCRIPTION OF EMBODIMENTS

The following describes in detail a nonaqueous electrolyte, a lithium-ion battery, a battery module, a battery pack, and an apparatus according to this application.

The nonaqueous electrolyte according to the first aspect of this application is described first. The nonaqueous electrolyte includes a nonaqueous solvent and a lithium salt, where the nonaqueous solvent includes a carbonate solvent and a high oxidation potential solvent, and the lithium salt is a mixed lithium salt formed by $LiPF_6$ and $LiN(FSO_2)_2$ (LiFSI for short).

The high oxidation potential solvent is selected from one or more of compounds represented by formula I and formula II. In formula I, $R_1$ and $R_2$ are independently selected from unsubstituted, partially halogenated, or fully halogenated alkyl groups having 1 to 5 carbon atoms, and at least one of $R_1$ and $R_2$ is a partially halogenated or fully halogenated alkyl group having 1 to 5 carbon atoms. In formula II, $R_3$ is selected from partially halogenated or fully halogenated alkylidene groups having 1 to 6 carbon atoms. In $R_1$, $R_2$, $R_3$, a halogen atom is selected from one or more of F, Cl, Br, and I, and further, the halogen atom is F. The alkyl group and the alkylidene group may be straight-chained or branched. When the alkyl group or the alkylidene group is partially or fully halogenated, the halogen atom may be of one or more types.

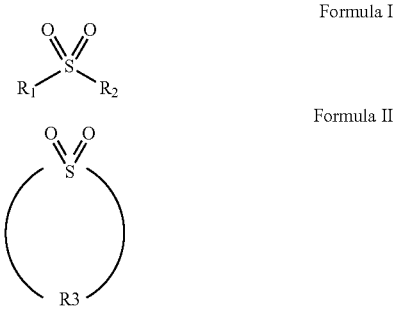

At present, carbonate solvents are generally used in electrolytes of lithium-ion batteries. As this type of solvent has poor oxidation resistance, the solvent may have slight oxidation at even about 4 V under room temperature (25° C.). As the voltage and temperature increase, the solvent has more and more substantial oxidization and gas generation. In addition, as this type of solvent has a low flash point (generally below 35° C.), the solvent may easily burn when exposed to an open flame, and releases a large amount of heat. Therefore, the lithium-ion batteries using the conventional carbonate solvents have high potential hazards in safety performance.

In the nonaqueous electrolyte of this application, the high oxidation potential solvent and the carbonate solvent are used to form a mixed solvent. As the high oxidation potential solvent has advantages of high oxidation resistance and non-flammability, and can overcome disadvantages of poor oxidation resistance, easy high-pressure decomposition and gas generation, a low flash point, easy combustion and the like of conventional carbonate solvents, the nonaqueous electrolyte of this application may greatly improve safety performance such as overcharge safety and hot box safety of a lithium-ion battery, and may also improve electrochemical performance such as storage life and cycle life of a high-temperature and high-voltage battery system.

However, the high oxidation potential solvent has relatively large viscosity, overall viscosity of the nonaqueous electrolyte increases greatly, ion conduction becomes slow, electrical conductivity decreases, and kinetic performance of the lithium-ion battery deteriorates. The nonaqueous electrolyte of this application uses a mixed lithium salt formed by $LiPF_6$ and LiFSI. LiFSI has advantages of moderate viscosity and a high degree of dissociation, and can facilitate ion conduction and improve electrical conductivity of the nonaqueous electrolyte. Therefore, use of the mixed lithium salt may effectively make up for low electrical conductivity of the nonaqueous electrolyte caused by high viscosity of the high oxidation potential solvent, and helps to obtain a lithium-ion battery with good kinetics performance. In addition, with higher thermal stability than that of $LiPF_6$, LiFSI can also improve safety performance such as overcharge safety and hot box safety of the lithium-ion battery.

In the mixed lithium salt formed by $LiPF_6$ and $LiN(FSO_2)_2$, when a relative percentage of $LiN(FSO_2)_2$ is relatively high, electrical conductivity of the nonaqueous electrolyte is significantly improved, and kinetic performance of the lithium-ion battery is significantly improved, but a risk of corrosion to a current collector (such as aluminum foil) also increases, which is detrimental to cycle performance of the lithium-ion battery. When the relative percentage of $LiPF_6$ is relatively high, the effect made by $LiN(FSO_2)_2$ in improving kinetic performance and safety performance of the lithium-ion battery is limited. In some embodiments, a weight ratio of $LiPF_6$ to $LiN(FSO_2)_2$ is 10:1 to 1:10. In some embodiments, the weight ratio of $LiPF_6$ to $LiN(FSO_2)_2$ is 4:1 to 1:4.

In the nonaqueous electrolyte of this application, when a weight percentage of the high oxidation potential solvent is relatively low, the effect in overcoming the disadvantages of carbonate solvents such as poor oxidation resistance, easy high-pressure decomposition and gas generation, a low flash point, and easy combustion is not obvious. When the weight percentage of the high oxidation potential solvent is relatively high, overall viscosity of the nonaqueous electrolyte increases greatly but electrical conductivity reduces, which has greater impact on kinetic performance of the lithium-ion battery. Therefore, in some embodiments, based on a total weight of the nonaqueous solvent, when the weight percentage of the high oxidation potential solvent is 10% to 60%, the advantages of high oxidation resistance and non-flammability of the high oxidation potential solvent may be better combined with the advantages of low viscosity and a high dielectric constant of the carbonate solvent. Therefore, not only safety performance such as overcharge safety and hot box safety of the lithium-ion battery and electrochemical performance of the lithium-ion battery under high temperature and high voltage may be improved, but also the lithium-ion battery may be ensured to have some kinetic performance. In some embodiments, based on a total weight of the nonaqueous solvent, a weight percentage of the high oxidation potential solvent is 20% to 40%.

In the nonaqueous electrolyte of this application, when a weight percentage of the carbonate solvent is relatively low, the effect of improving the disadvantages such as high viscosity of the high oxidation potential solvent is not obvious. Relatively large overall viscosity and relatively low electrical conductivity of the nonaqueous electrolyte has relatively great impact on kinetic performance of the lithium-ion battery. When the weight percentage of the carbonate solvents is relatively high, the nonaqueous electrolyte has poor oxidation resistance, is easy to decompose and generate gas under high pressure, and is easy to combust, which has relatively great impact on safety performance such as overcharge safety and hot box safety of the lithium-ion battery. Therefore, in some embodiments, based on a total weight of the nonaqueous solvent, when the weight percentage of the carbonate solvent is 40% to 90%, the advantages of high oxidation resistance and non-flammability of the high oxidation potential solvent may be better combined with the advantages of low viscosity and a high dielectric constant of the carbonate solvent. Therefore, not only safety performance such as overcharge safety and hot box safety of the lithium-ion battery and electrochemical performance of the lithium-ion battery under high temperature and high voltage may be improved, but also the lithium-ion battery may be ensured to have some kinetic performance. In some embodiments, based on the total weight of the nonaqueous solvent, the weight percentage of the carbonate solvent is 60% to 80%.

In the nonaqueous electrolyte of this application, in some embodiments, the high oxidation potential solvent contains at least one F atom, and presence of the F atom may better improve the oxidation resistance and flame retardancy of the high oxidation potential solvent.

In the nonaqueous electrolyte of this application, in some embodiments, in formula I, $R_1$ and $R_2$ are independently selected from unsubstituted, partially fluorinated or fully fluorinated alkyl groups having 1 to 5 carbon atoms, and at least one of $R_1$ and $R_2$ is a partially fluorinated or fully fluorinated alkyl group having 1 to 5 carbon atoms. In some embodiments, $R_1$ and $R_2$ are independently selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ and $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, —$CF_2CF_2CH_3$, or —$CF_2CF_2CF_3$.

In the nonaqueous electrolyte of this application, in some embodiments, in formula II, $R_3$ is selected from partially fluorinated or fully fluorinated alkylidene groups having 1 to 6 carbon atoms. In some embodiments, $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, and —$CH_2CH_2CH(CF_3)CH_2CHFCH_2$—.

In the nonaqueous electrolyte of this application, when the substituents $R_1$ and $R_2$ have a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_1$ and $R_2$ are independently selected from unsubstituted, partially halogenated, or fully halogenated alkyl groups having 1 to 3 carbon atoms, and at least one of $R_1$ and $R_2$ is a partially halogenated or fully halogenated alkyl group having 1 to 3 carbon atoms. In some embodiments, $R_1$ and $R_2$ are independently selected from unsubstituted, partially fluorinated or fully fluorinated alkyl groups having 1 to 3 carbon atoms, and at least one of $R_1$ and $R_2$ is a partially fluorinated or fully fluorinated alkyl group having 1 to 3 carbon atoms.

In the nonaqueous electrolyte of this application, when the substituent $R_3$ has a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_3$ is selected from partially halogenated or fully halogenated alkylidene groups having 1 to 4 carbon atoms. In some embodiments, $R_3$ is selected from partially fluorinated or fully fluorinated alkylidene groups having 1 to 4 carbon atoms.

In the nonaqueous electrolyte of this application, in some embodiments, the high oxidation potential solvent may be specifically selected from one or more of the following compounds:

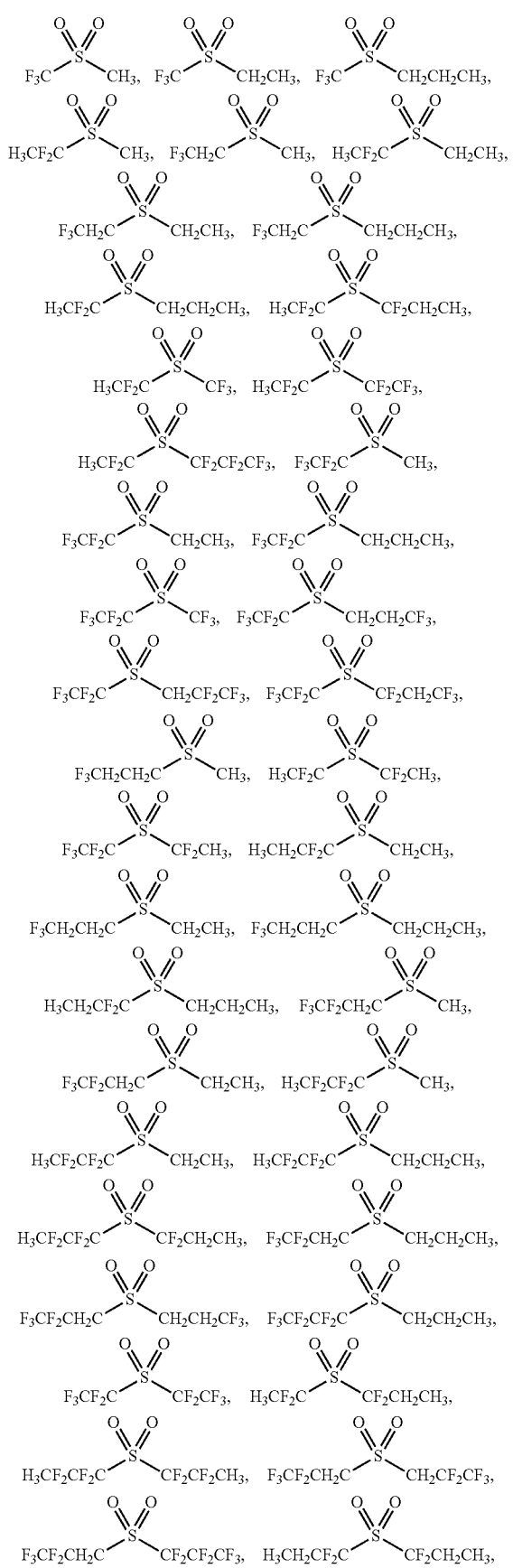
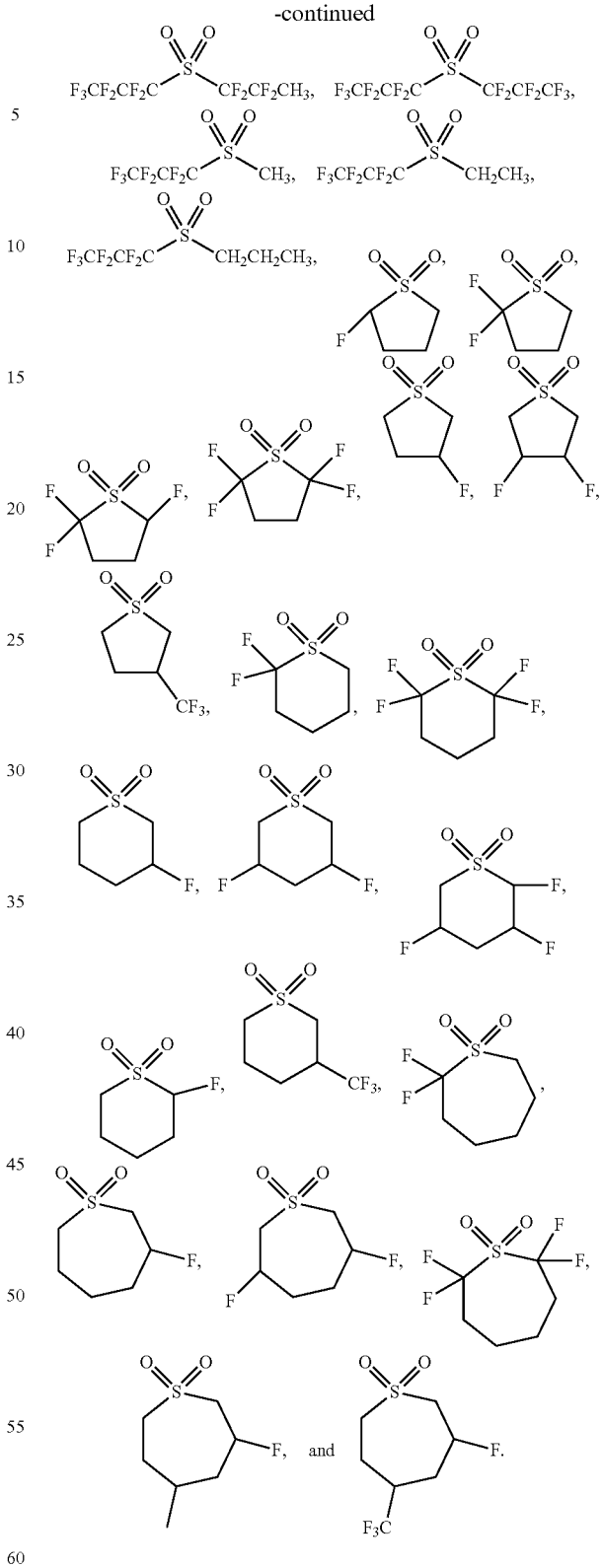
In the nonaqueous electrolyte of this application, the high oxidation potential solvent is selected from one or more of the compounds represented by formula I and formula II. By performing comparison between the two, the compound represented by formula I is characterized by lower viscosity and a lower dielectric constant, while the compound represented by formula II is characterized by higher viscosity and a higher dielectric constant. Therefore, in some embodiments, the high oxidation potential solvent includes both the compound represented by formula I and the compound represented by formula II. In some embodiments, the high oxidation potential solvent may only include the compound represented by formula I.

In the nonaqueous electrolyte of this application, in some embodiments, a weight of the compound represented by formula I accounts for 30% to 100% of a total weight of the high oxidation potential solvent, and a weight of the compound represented by formula II accounts for 0% to 70% of the total weight of the high oxidation potential solvent.

In the nonaqueous electrolyte of this application, the carbonate solvent may be selected from one or more of cyclic carbonate and linear carbonate. In some embodiments, the carbonate solvent is selected from linear carbonate or a mixture of linear carbonate and cyclic carbonate. The linear carbonate is characterized by low viscosity, and a defect of high viscosity of the high oxidation potential solvent may be effectively alleviated by adding the linear carbonate. The cyclic carbonate is characterized by a high dielectric constant. After the cyclic carbonate is added, solubility of the nonaqueous solvent to a lithium salt may be improved, and a defect of a low dielectric constant of the high oxidation potential solvent may be significantly improved, which may effectively improve electrical conductivity of the nonaqueous electrolyte and contribute to obtain the lithium-ion battery with good kinetic performance.

In some embodiments, based on the total weight of the nonaqueous solvent, the weight percentage of the cyclic carbonate is 0% to 10%. The weight percentage of the cyclic carbonate may be 0. In this case, the carbonate solvent is only linear carbonate, but does not include cyclic carbonate. The cyclic carbonate is characterized by a high dielectric constant. After the cyclic carbonate is added, solubility of the nonaqueous solvent to a lithium salt may be improved, the overall viscosity of the nonaqueous electrolyte is further reduced, and electrical conductivity of the nonaqueous electrolyte is improved. However, the cyclic carbonate is prone to high positive electrode oxidation and gas generation, and releases a large amount of heat. Therefore, a high percentage of the cyclic carbonate affects storage performance and safety performance of the lithium-ion battery. Further, when the carbonate solvent is a mixture of cyclic carbonate and linear carbonate, in some embodiments, based on the total weight of the nonaqueous solvent, the weight percentage of the cyclic carbonate is 3% to 8%.

In some embodiments, a weight ratio of the linear carbonate to the cyclic carbonate is 80:1 to 1:1. In some embodiments, the weight ratio of the linear carbonate to the cyclic carbonate is 15:1 to 3:1.

The cyclic carbonate may be selected from one or more of compounds represented by formula III, and the linear carbonate may be selected from one or more of compounds represented by formula IV. In formula III, $R_{11}$ is selected from unsubstituted alkyl groups having 1 to 5 carbon atoms. In formula IV, $R_{12}$ and $R_{13}$ are selected from unsubstituted alkyl groups having 1 to 5 carbon atoms, and $R_{12}$ and $R_{13}$ may be the same, or may be different. In $R_{11}$, $R_{12}$, $R_{13}$, the alkyl group may be straight-chained or branched.

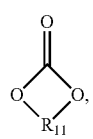

Formula III

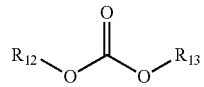

Formula IV

In some embodiments, the cyclic carbonate may be specifically selected from one or more of ethylene carbonate and propylene carbonate, and the linear carbonate may be specifically selected from one or more of ethyl methyl carbonate, methyl propyl carbonate, methyl isopropyl carbonate, methyl butyl carbonate, ethyl propyl carbonate, dimethyl carbonate, diethyl carbonate, dipropyl carbonate, and dibutyl carbonate.

In the nonaqueous electrolyte of this application, as viscosity of the high oxidation potential solvent is typically greater than that of the carbonate solvent, electrical conductivity of the nonaqueous electrolyte may be easily affected, thereby affecting charge and discharge capacity, cycle life, and kinetic performance of the lithium-ion battery. Therefore, electrical conductivity of the nonaqueous electrolyte may also be improved by using the high oxidation potential solvent in combination with a suitable type of carbonate solvent, to further improve the charge and discharge capacity, cycle life, and kinetic performance of the lithium-ion battery. In some embodiments, room-temperature electrical conductivity of the nonaqueous electrolyte is controlled to be greater than or equal to 5.0 mS/cm. Among carbonate solvents, linear carbonate is generally characterized by low viscosity. As such, in some embodiments, the carbonate solvent includes at least the linear carbonate. In some embodiments, the carbonate solvent includes at least one of ethyl methyl carbonate, dimethyl carbonate, and diethyl carbonate. The linear carbonate has even lower viscosity, and therefore may effectively make up for low electrical conductivity of the nonaqueous electrolyte caused by high viscosity of the high oxidation potential solvent.

In the nonaqueous electrolyte of this application, a specific concentration of the lithium salt is not specifically limited either, and may be adjusted according to an actual need. For example, a concentration of the lithium salt may specifically be 0.7 mol/L to 2 mol/L.

In the nonaqueous electrolyte of this application, in some embodiments, the nonaqueous electrolyte may further include a film-forming additive, and the film-forming additive helps to form an interface protective film of superior performance on the negative electrode and the positive electrode, thereby further improving electrochemical performance such as kinetic performance, cycle life, and storage life of the lithium-ion battery.

In some embodiments, based on a total weight of the nonaqueous electrolyte, a weight percentage of the film-forming additive is 0.01% to 10%. In some embodiments, based on the total weight of the nonaqueous electrolyte, the weight percentage of the film-forming additive is 0.1% to 5%.

In some embodiments, the film-forming additive may be specifically selected from one or more of a cyclic carbonate compound with an unsaturated bond, a halogen-substituted cyclic carbonate compound, a sulfate compound, a sulfite compound, a sultone compound, a disulfonate compound, a nitrile compound, an aromatic compound, an isocyanate compound, a phosphazene compound, a cyclic anhydride compound, a phosphite compound, a phosphate compound, a borate compound, and a carboxylate compound.

In some embodiments, the film-forming additive may be specifically selected from one or more of 1,3-propane sultone (PS), ethylene sulfate (DTD), fluoroethylene carbonate (FEC), difluoroethylene carbonate (DFEC), vinylene carbonate (VC), 1,3-propene sultone (PES), adiponitrile (ADN), and succinonitrile (SN). These types of film-forming additives help to form a stable interface protective film on the negative electrode and the positive electrode, and effectively inhibit side reactions of the high oxidation potential solvent on the negative electrode and the positive electrode, thereby effectively improve electrochemical performance such as kinetic performance, cycle life, and storage life of the lithium-ion battery.

In some embodiments, the film-forming additive contains at least DTD. A reason is that although the high oxidation potential solvent has the advantages of high oxidation resistance and non-flammability, the high oxidation potential solvent has poor compatibility with the negative electrode and may have side reactions on the negative electrode. After being added, DTD may first form a stable interface protective film on the negative electrode, thereby suppressing side reactions of the high oxidation potential solvent on the negative electrode. In addition, DTD may generate lithium sulfate that structurally contains an alkoxy structure (—$CH_2CH_2O$—) in the process of film forming on the negative electrode. This can effectively adjust viscoelasticity of the interface protective film on the negative electrode, further improve kinetics of lithium ion transfer at the interface, and finally form a thin and dense interface protective film with good kinetics of lithium ion transfer on the negative electrode. In addition, DTD may also form a stable interface protective film on a surface of the positive electrode to further improve oxidation resistance of the nonaqueous electrolyte. As such, the addition of DTD may better improve kinetic performance and electrochemical performance such as cycle life and storage life of the lithium-ion battery, and may also improve safety performance such as overcharge safety and hot box safety of the lithium-ion battery to some extent.

In some embodiments, the film-forming additive contains at least both DTD and FEC. Provided that DTD is added, after FEC is further added, cycle life of the lithium-ion battery is further improved. A possible reason is that: FEC may be reduced on the negative electrode to form a stable interface protective film, thereby weakening reduction reactions of DTD on the negative electrode. This may help to improve film-forming quality of DTD on a surface of the positive electrode, which further facilitates improvement of cycle life of the lithium-ion battery.

The lithium-ion battery according to the second aspect of this application is described next.

Figure 2:
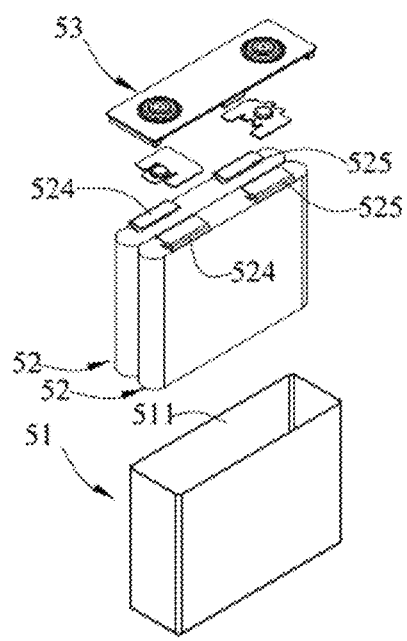
FIG. 2 is an exploded view of FIG. 1.
Figure 3:
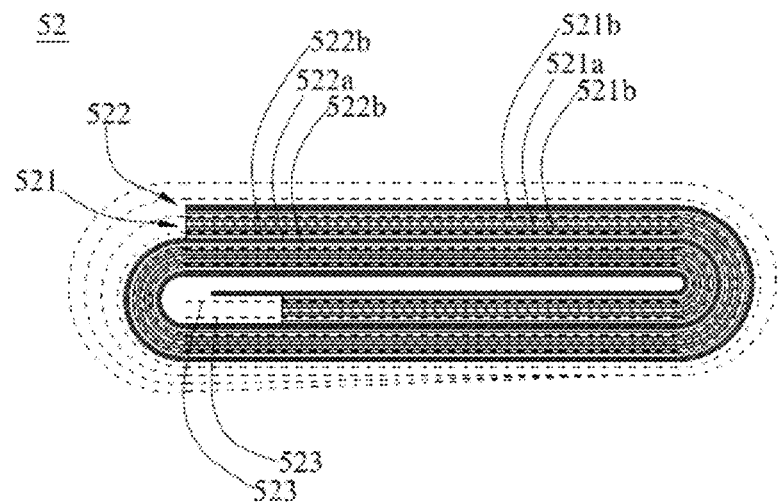
FIG. 3 is a schematic diagram of an embodiment of an electrode assembly of the lithium-ion battery in FIG. 2, in which a first electrode plate, a second electrode plate, and a separator are wound to form a wound electrode assembly.
Figure 4:
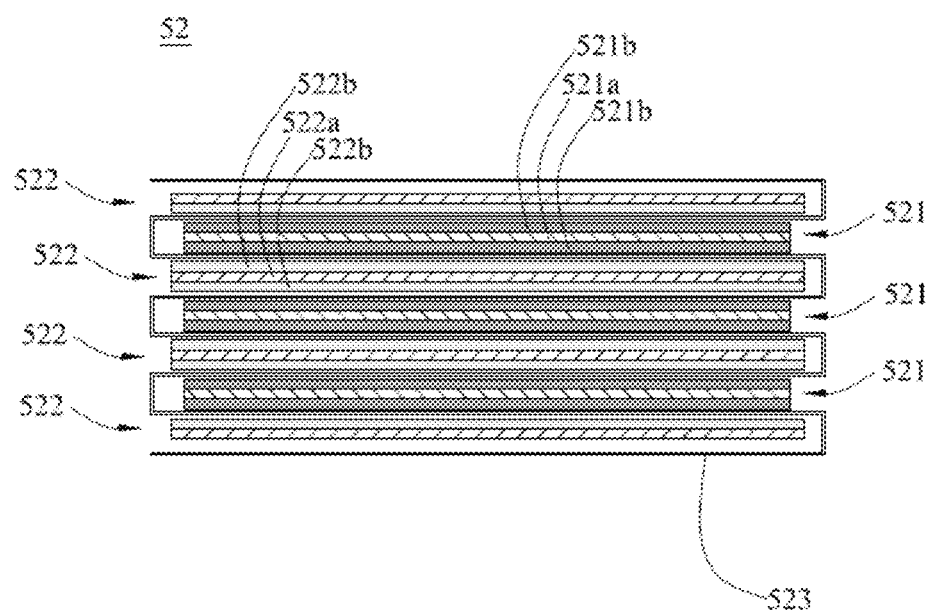
FIG. 4 is a schematic diagram of another embodiment of an electrode assembly of the lithium-ion battery in FIG. 2, in which a first electrode plate, a second electrode plate, and a separator are laminated along a thickness direction to form a laminated electrode assembly.

FIG. 1 is a perspective view of an embodiment of a lithium-ion battery 5. FIG. 2 is an exploded view of FIG. 1. FIG. 3 is a schematic diagram of an embodiment of an electrode assembly 52 of the lithium-ion battery 5 in FIG. 2, in which a first electrode plate 521, a second electrode plate 522, and a separator 523 are wound to form a wound electrode assembly. FIG. 4 is a schematic diagram of another embodiment of an electrode assembly 52 of the lithium-ion battery 5 in FIG. 2, in which a first electrode plate 521, a second electrode plate 522, and a separator 523 are laminated along a thickness direction to form a laminated electrode assembly.

With reference to FIG. 1 to FIG. 4, the lithium-ion battery 5 includes a housing 51, the electrode assembly 52, a top cover assembly 53, and an electrolyte (not shown).

The electrode assembly 52 is accommodated in the housing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b provided on a surface of the first current collector 521a. The first active material layer 521b contains a first active material. The first active material layer 521b may be provided on one surface or two surfaces of the first current collector 521a depending on an actual need. The second electrode plate 522 includes a second current collector 522a and a second active material layer 522b provided on a surface of the second current collector 522a. The second active material layer 522b may be provided on one surface or two surfaces of the second current collector 522a depending on an actual need. The second active material layer 522b contains a second active material. The first active material and the second active material implement deintercalation of lithium ions. Electrical polarities of the first electrode plate 521 and the second electrode plate 522 are opposite. To be specific, one of the first electrode plate 521 and the second electrode plate 522 is a positive electrode plate, and the other of the first electrode plate 521 and the second electrode plate 522 is a negative electrode plate. The first tab 524 may be formed by cutting the first current collector 521a, or may be formed separately and fixedly connected to the first current collector 521a. Similarly, the second tab 525 may be formed by cutting the second current collector 522a, or may be formed separately and fixedly connected to the second current collector 522a.

A quantity of the electrode assemblies 52 is not limited, and may be one or more.

The electrolyte is injected into the housing 51 and impregnates the electrode assembly 51. Specifically, the electrolyte impregnates the first electrode plate 521, the second electrode plate 522, and the separator 523.

It is noted that the lithium-ion battery 5 shown in FIG. 1 is a tank type battery, but is not limited thereto. The lithium-ion battery 5 may be a pouch type battery, which means that the housing 51 is replaced by a metal plastic film and the top cover assembly 53 is eliminated.

In the lithium-ion battery 5, as one of the first electrode plate 521 and the second electrode plate 522 is the positive electrode plate, a current collector of the positive electrode plate is a positive current collector, an active material layer of the positive electrode plate is a positive active material layer, and an active material of the positive electrode plate is a positive active material. As such, the positive electrode plate includes the positive current collector and the positive active material layer provided on a surface of the positive current collector.

In another word, the lithium-ion battery according to the second aspect of this application includes a positive electrode plate, a negative electrode plate, a separator and the nonaqueous electrolyte according to the first aspect of this application.

In the lithium-ion battery in this application, the positive electrode plate may include a positive active material, a conductive agent and a binder. The positive active material may be selected from a layered lithium-containing oxide, a spinel-type lithium-containing oxide, and the like. Specifically, the positive active material may be selected from one or more of a lithium cobalt oxide, a lithium nickel oxide, a lithium manganese oxide, a lithium nickel manganese oxide, a lithium nickel cobalt manganese oxide, and a lithium nickel cobalt aluminum oxide. However, this application is not limited to these materials, and other conventionally well-known materials that can be used as a positive active material of a lithium-ion battery may also be used. One type of these positive active materials may be used alone, or two or more types may be used in combination, at a combination ratio adjustable depending on an actual need. Types of the conductive agent and the binder are not specifically limited, and may be selected depending on an actual need.

When voltage of the lithium-ion battery is higher, the lithium-ion battery may have higher charge and discharge capacity and higher energy density, but a conventional electrolyte may be oxidized to produce gas and release heat. This may change service life and high-temperature performance of the lithium-ion battery, especially in the process of abuse. For example, at a 150° C. hotbox, the lithium-ion battery may easily burn. However, the nonaqueous electrolyte of this application contains a high oxidation potential solvent, which can greatly improve oxidation resistance of the nonaqueous electrolyte and reduce heat release, thereby effectively improving high-temperature performance of the lithium-ion battery. As such, the nonaqueous electrolyte in this application can more significantly improve performance of a battery system with high positive electrode oxidation or high positive electrode oxidation potential, especially electrochemical performance of the lithium-ion battery under high temperature and high voltage. Gas generation of the lithium-ion battery under high temperature and high voltage may be even more significantly suppressed, and safety performance such as overcharge safety and hot box safety of the lithium-ion battery may also be more significantly improved.

In some embodiments, the positive active material is one or more of $Li_{1+x}Ni_aCo_bM'_{(1-a-b)}O_{2-c}Y_c$, and $Li_{1+y}Ni_mMn_nM''_{2-m-n}O_{4-p}Z_p$, where $-0.1 \le x \le 0.2$, $0.6 \le a \le 1$, $0 \le b < 1$, $0 \le (1-ab) < 1$, $0 \le c < 1$, M' is selected from one or more of Mn, Al, Mg, Zn, Ga, Ba, Fe, Cr, Sn, V, Sc, Ti, and Zr, and Y is selected from one or more of F, Cl, and Br; and $-0.1 \le y \le 0.2$, $0.4 \le m \le 1.2$, $0.8 \le n \le 1.6$, $0 \le (2-mn) \le 0.3$, $0 \le p \le 1$, M" is selected from one or more of Al, Mg, Zn, Ga, Ba, Fe, Cr, Sn, V, Sc, Ti, and Zr, and Z is selected from one or more of F, Cl, and Br. In some embodiments, the positive active material may be specifically selected from one or more of $LiNi_{0.6}Co_{0.2}Mn_{0.2}O_2$, $LiNi_{0.8}Co_{0.1}Mn_{0.1}O_2$, $LiNi_{0.85}Co_{0.15}Al_{0.05}O_2$, and $LiNi_{0.5}Mn_{1.5}O_4$. As Ni content in the positive active material increases, the positive active material has increased charge and discharge capacity, but reduced thermal stability. As such, the positive active material may release a strong oxidizing substance under high temperature, oxidizing the nonaqueous electrolyte and deteriorating high-temperature performance of the lithium-ion battery. The nonaqueous electrolyte of this application contains an oxidation resistant high oxidation potential solvent, which can greatly improve oxidation resistance of the nonaqueous electrolyte and reduce heat release, thereby effectively improving high-temperature performance of the lithium-ion battery.

In the lithium-ion battery in this application, in some embodiments, an end-of-charge voltage of the lithium-ion battery is U, where $4.3V \le U \le 6V$. That is, the nonaqueous electrolyte in this application may increase the end-of-charge voltage of the lithium-ion battery to 4.3 V or more.

In the lithium-ion battery in this application, the negative electrode plate may include a negative active material, a conductive agent and a binder. The negative active material may in some embodiments be selected from a carbon-based material, a silicon-based material, a tin-based material, and the like. Specifically, the negative active material may be selected from soft carbon, hard carbon, artificial graphite, natural graphite, silicon, silicon oxide, silicon carbon composite, silicon alloy, tin, tin oxide, tin alloy, lithium titanate, a metal that can form an alloy with lithium, and the like. However, this application is not limited to these materials, and other conventionally well-known materials that can be used as a negative active material of a lithium-ion battery may also be used. One type of these negative active materials may be used alone, or two or more types may be used in combination, at a combination ratio adjustable depending on an actual need. Types of the conductive agent and the binder are not specifically limited, and may be selected depending on an actual need.

In the lithium-ion battery of this application, a specific type of the separator is not specifically limited, and the separator may be made of any separator material used in existing batteries, such as a polyolefin separator, a ceramic separator, or the like. Specifically, the separator may in some embodiments be a polyethylene film, a polypropylene film, a polyvinylidene fluoride film, or a multilayer composite film thereof, but this application is not limited thereto.

The battery module according to the third aspect of this application is described next.

Figure 5:
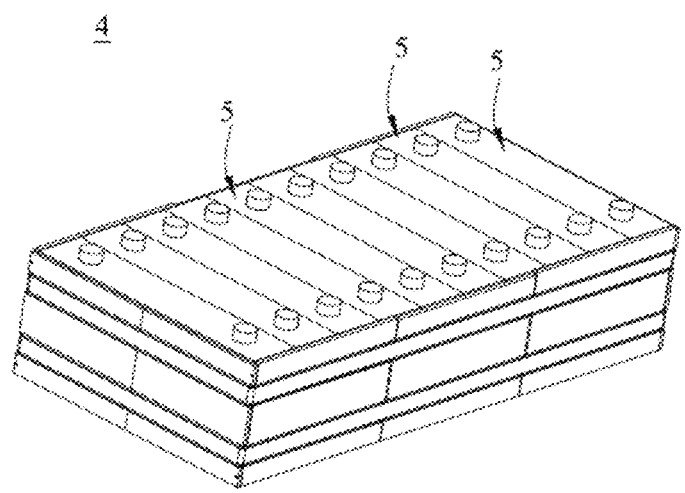
FIG. 5 is a perspective view of an embodiment of a battery module.

FIG. 5 is a perspective view of an embodiment of a battery module 4.

The battery module 4 according to the third aspect of this application includes the lithium-ion battery 5 according to the second aspect of this application.

Referring to FIG. 5, the battery module 4 includes a plurality of lithium-ion batteries 5. The plurality of lithium-ion batteries 5 are arranged in a longitudinal direction. The battery module 4 may be used as a power supply or an energy storage apparatus. A quantity of lithium-ion batteries 5 included in the battery module 4 may be adjusted based on use, a capacity design, and the like of the battery module 4.

The battery pack according to the fourth aspect of this application is described next.

Figure 6:
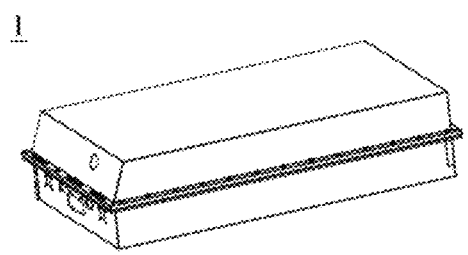
FIG. 6 is a perspective view of an embodiment of a battery pack.
Figure 7:
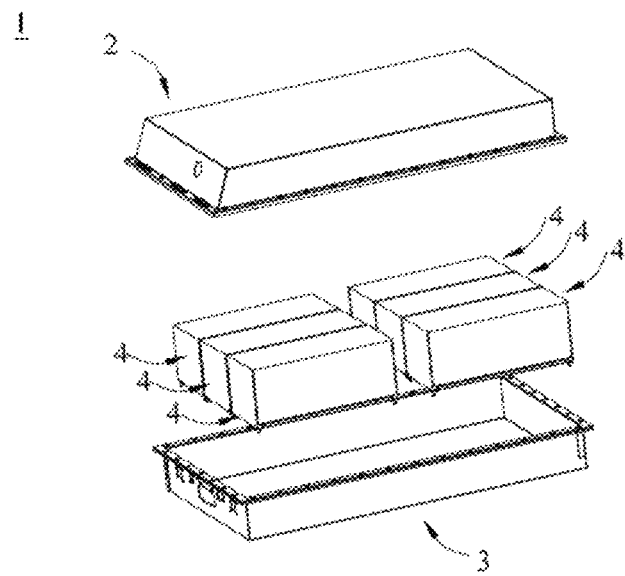
FIG. 7 is an exploded view of FIG. 6.

FIG. 6 is a perspective view of an embodiment of a battery pack 1. FIG. 7 is an exploded view of FIG. 6.

The battery pack 1, provided in the fourth aspect of this application, including the battery module 4 according to the third aspect of this application is described.

Specifically, referring to FIG. 6 and FIG. 7, the battery pack 1 includes an upper box body 2, a lower box body 3, and the battery module 4. The upper box body 2 and the lower box body 3 are assembled together to form a space for accommodating the battery module 4. The battery module 4 is disposed in the space formed by the upper box body 2 and the lower box body 3 that are assembled together. An output electrode of the battery module 4 penetrates through one or both of the upper box body 2 and the lower box body 3 to output power or to charge from an outer source. A quantity and an arrangement of the battery modules 4 used in the battery pack 1 may be determined depending on an actual need. The battery pack 1 may be used as a power supply or an energy storage apparatus.

The apparatus according to the fifth aspect of this application is described next.

Figure 8:
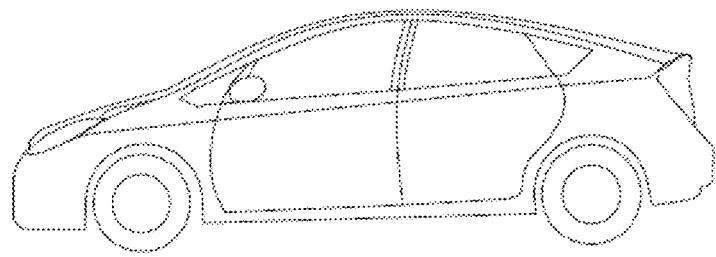
FIG. 8 is a schematic diagram of an embodiment of an apparatus using a lithium-ion battery as a power supply.

FIG. 8 is a schematic diagram of an embodiment of an apparatus using a lithium-ion battery as a power supply.

The apparatus provided in the fifth aspect of this application includes the lithium-ion battery according to the second aspect of this application, where the lithium-ion battery is used as a power supply for the apparatus. In FIG. 8, the apparatus using the lithium-ion battery 5 is an electromobile. The apparatus using the lithium-ion battery 5 is obviously not limited to this, but may be any electric vehicles other than electromobiles (for example, an electric bus, an electric tram, an electric bicycle, an electric motorcycle, an electric scooter, an electric golf cart, and an electric truck), an electric vessel, an electric tool, an electronic device, and an energy storage system. The electromobile may be a full electric vehicle, a hybrid electric vehicle, or a plug-in hybrid electric vehicle. Certainly, depending on an actual use form, the apparatus provided in the fifth aspect of this application may include the battery module 4 according to the third aspect of this application. Certainly, the apparatus provided in the fifth aspect of this application may also include the battery pack 1 according to the fourth aspect of this application.

To make the objectives, technical solutions, and beneficial technical effects of this application clearer, this application is further described below in detail with reference to examples. It should be understood that the examples described in this specification are merely intended to explain this application, but not to limit this application. Formulations, proportions, and the like in the examples may be selected as appropriate to local conditions, which has no substantial effect on results.

For ease of description, reagents used in preparation of the nonaqueous electrolyte are denoted as follows:

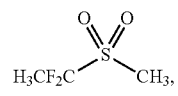
A1

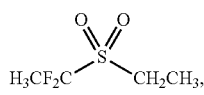
A2

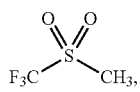
A3

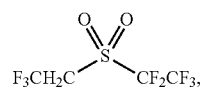
A4

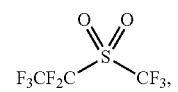
A5

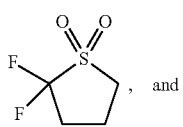
A6
, and

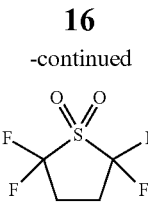
A7

Example 1

(1) Preparation of a Nonaqueous Electrolyte

A compound A1, ethyl methyl carbonate (EMC), and ethylene carbonate (EC) were mixed at a weight ratio of 30:65:5 to form a nonaqueous solvent, then 1 mol/L of LiPF6 and 1 mol/L of LiFSI were dissolved as a lithium salt at a weight ratio of 10:1 to configure a nonaqueous electrolyte.

(2) Preparation of a Positive Electrode Plate

A positive active material $LiNi_{0.8}Co_{0.1}Mn_{0.1}O_2$, an acetylene black conductive agent, and a polyvinylidene fluoride (PVDF) binder were fully stirred and uniformly mixed in an N-methylpyrrolidone solvent system at a weight ratio of 94:3:3, and then the mixture was applied onto a current collector Al foil, followed by drying and cold pressing to obtain a positive electrode plate.

(3) Preparation of a Negative Electrode Plate

A negative active material artificial graphite, an acetylene black conductive agent, a styrene-butadiene rubber binder, a sodium carboxymethyl cellulose thickener were fully stirred and uniformly mixed at a weight ratio of 95:2:2:1 in a deionized water solvent system, and then the mixture was applied onto a current collector Cu foil, followed by drying and cold pressing to obtain a negative electrode plate.

(4) Preparation of a Separator

A polyethylene film was used as a separator.

(5) Preparation of a Lithium-Ion Battery

The positive electrode plate, the separator, and the negative electrode plate were laminated in order, so that the separator was interposed between the positive electrode plate and negative electrode plate to provide separation. Then the laminated product was wound to obtain an electrode assembly. The electrode assembly was placed in an outer package and dried, and the nonaqueous electrolyte was then injected. Then, after vacuum packaging, standing, chemical conversion, shaping, and other processes, a lithium-ion battery was obtained.

The lithium-ion batteries in Examples 2 to 29 and Comparative Examples 1 to 7 were all prepared according to a method similar to that in Example 1, and specific differences are shown in Table 1.

TABLE 1

Compositions of the nonaqueous electrolytes prepared in Examples 1 to 29 and Comparative Examples 1 to 7

| | Composition of nonaqueous solvents and weight percentages of individual components | | | | | | Film-forming additive | | Lithium salt | |
|---|---|---|---|---|---|---|---|---|---|---|
| | High oxidation potential solvent | | Linear carbonate | | Cyclic carbonate | | Component | Percentage | Component | Concentration |
| Example 1 | A1 | 30% | EMC | 65% | EC | 5% | / | / | LiPF$_6$:LiFSI = 10:1 | 1M |
| Example 2 | A1 | 30% | EMC | 65% | EC | 5% | / | / | LiPF$_6$:LiFSI = 5:1 | 1M |
| Example 3 | A1 | 30% | EMC | 65% | EC | 5% | / | / | LiPF$_6$:LiFSI = 2:1 | 1M |

TABLE 1-continued

Compositions of the nonaqueous electrolytes prepared in Examples 1 to 29 and Comparative Examples 1 to 7

| | Composition of nonaqueous solvents and weight percentages of individual components | | | | | | Film-forming additive | | Lithium salt | |
|---|---|---|---|---|---|---|---|---|---|---|
| | High oxidation potential solvent | | Linear carbonate | | Cyclic carbonate | | Component | Percentage | Component | Concentration |
| Example 4 | A1 | 30% | EMC | 65% | EC | 5% | / | / | LiPF$_6$:LiFSI = 1:1 | 1M |
| Example 5 | A1 | 30% | EMC | 65% | EC | 5% | / | / | LiPF$_6$:LiFSI = 1:2 | 1M |
| Example 6 | A1 | 30% | EMC | 65% | EC | 5% | / | / | LiPF$_6$:LiFSI = 1:5 | 1M |
| Example 7 | A1 | 30% | EMC | 65% | EC | 5% | / | / | LiPF$_6$:LiFSI = 1:10 | 1M |
| Example 8 | A1 | 30% | EMC | 65% | EC | 5% | / | / | LiPF$_6$:LiFSI = 15:1 | 1M |
| Example 9 | A1 | 30% | EMC | 65% | EC | 5% | / | / | LiPF$_6$:LiFSI = 1:15 AM | 1M |
| Example 10 | A1 | 50% | DMC | 45% | EC | 5% | / | / | LiPF$_6$:LiFSI = 1:1 | 1M |
| Example 11 | A1 | 40% | DMC | 55% | EC | 5% | / | / | LiPF$_6$:LiFSI = 1:1 | 1M |
| Example 12 | A1 | 20% | DMC | 75% | EC | 5% | / | / | LiPF$_6$:LiFSI = 1:1 | 1M |
| Example 13 | A1 | 15% | DMC | 80% | EC | 5% | / | / | LiPF$_6$:LiFSI = 1:1 | 1M |
| Example 14 | A1 | 10% | DMC | 85% | EC | 5% | / | / | LiPF$_6$:LiFSI = 1:1 | 1M |
| Example 15 | A1 | 70% | DMC | 25% | EC | 5% | / | / | LiPF$_6$:LiFSI = 1:1 | 1M |
| Example 16 | A1 | 5% | DMC | 90% | EC | 5% | / | / | LiPF$_6$:LiFSI = 1:1 | 1M |
| Example 17 | A2 | 30% | EMC | 65% | EC | 5% | / | / | LiPF$_6$:LiFSI = 1:1 | 1M |
| Example 18 | A3 | 30% | EMC | 65% | EC | 5% | / | / | LiPF$_6$:LiFSI = 1:1 | 1M |
| Example 19 | A4 | 30% | EMC | 65% | EC | 5% | / | / | LiPF$_6$:LiFSI = 1:1 | 1M |
| Example 20 | A5 | 30% | EMC | 65% | EC | 5% | / | / | LiPF$_6$:LiFSI = 1:1 | 1M |
| Example 21 | A6 | 30% | EMC | 65% | EC | 5% | / | / | LiPF$_6$:LiFSI = 1:1 | 1M |
| Example 22 | A7 | 30% | EMC | 65% | EC | 5% | / | / | LiPF$_6$:LiFSI = 1:1 | 1M |
| Example 23 | A1:A6 = 70:30 | 30% | EMC | 65% | EC | 5% | / | / | LiPF$_6$:LiFSI = 1:1 | 1M |
| Example 24 | A2:A7 = 60:40 | 30% | EMC | 65% | EC | 5% | / | / | LiPF$_6$:LiFSI = 1:1 | 1M |
| Example 25 | A1 | 30% | EMC | 65% | EC | 5% | DTD | 2% | LiPF$_6$:LiFSI = 1:1 | 1M |
| Example 26 | A1 | 30% | EMC | 65% | EC | 5% | PS | 2% | LiPF$_6$:LiFSI = 1:1 | 1M |
| Example 27 | A1 | 30% | EMC | 65% | EC | 5% | VC | 2% | LiPF$_6$:LiFSI = 1:1 | 1M |
| Example 28 | A1 | 30% | EMC | 65% | EC | 5% | FEC | 2% | LiPF$_6$:LiFSI = 1:1 | 1M |
| Example 29 | A1 | 30% | EMC | 65% | EC | 5% | DTD + FEC | 1% + 1% | LiPF$_6$:LiFSI = 1:1 | 1M |
| Comparative Example 1 | / | / | EMC | 70% | EC | 30% | / | / | LiPF$_6$:LiFSI = 1:1 | 1M |
| Comparative Example 2 | A1 | 100% | / | / | / | / | / | / | LiPF$_6$:LiFSI = 1:1 | 1M |
| Comparative Example 3 | A1 | 30% | EMC | 65% | EC | 5% | / | / | LiPF$_6$ | 1M |
| Comparative Example 4 | A1 | 30% | EMC | 65% | EC | 5% | / | / | LiFSI | 1M |
| Comparative Example 5 | A1 | 30% | EMC | 65% | EC | 5% | / | / | LiN(CF$_3$SO$_2$)$_2$ | 1M |
| Comparative Example 6 | A1 | 30% | EMC | 65% | EC | 5% | / | / | LiCF$_3$SO$_3$ | 1M |
| Comparative Example 7 | Methyl ethyl sulfone | 30% | EMC | 65% | EC | 5% | / | / | LiPF$_6$:LiFSI = 1:1 | 1M |

Performance tests for the lithium-ion batteries are described next.

(1) High-Temperature Storage Gas Generation Test

Five lithium-ion batteries prepared in the Examples and five lithium-ion batteries prepared in the Comparative Examples were taken and placed at room temperature, charged to 4.3 V at a constant current of 0.5 C (that is, a current value at which the battery completely discharges its theoretical capacity in 2 h), and then charged at a constant voltage of 4.3 V until that the current was lower than 0.05 C, such that the lithium-ion batteries were in a 4.3 V fully charged state. A volume of a fully charged battery before storage was denoted as D0. The fully charged battery was placed in an oven at 85° C., taken out after 10 days, and tested for a volume after storage, where the volume after storage was denoted as D1.

A volume swelling ratio of the lithium-ion battery was ε=(D1−D0)/D0×100%.

(2) Thermal Shock Safety Performance (Hot Box) Test

Five lithium-ion batteries prepared in the Examples and five lithium-ion batteries prepared in the Comparative Examples were taken and placed at room temperature, charged to 4.3 V at a constant current of 0.5 C, and then charged at a constant voltage of 4.3 V until the current was lower than 0.05 C. The lithium-ion batteries were then placed in a thermostat, and the thermostat was heated to 150° C. at a heating rate of 5° C./min. Time h1 required for the thermostat to heat up from room temperature to 150° C. was recorded. The lithium-ion battery was then baked in the 150° C. thermostat until the lithium-ion battery caught smoke and a fire. Time h2 from when the thermostat was heated up from room temperature until when the lithium-ion battery caught smoke and a fire was recorded.

The thermal shock safety performance of the lithium-ion battery was characterized by time (h2−h1) for which the lithium-ion battery withstood baking at 150° C.

(3) Cycle Performance Test

Five lithium-ion batteries prepared in the Examples and five lithium-ion batteries prepared in Comparative Examples were taken, and were repeatedly charged and discharged through the following steps, and discharge capacity retention rates of the lithium-ion batteries were calculated.

First, in a room temperature environment, a first cycle of charge and discharge was performed, where the lithium-ion batteries were charged at a constant current of 0.5 C to an upper limit voltage of 4.3 V, and then charged at a constant voltage of 4.3 V until the current was lower than 0.05 C, and then discharged at a constant discharge current of 0.5 C until a final voltage was 3 V. A discharge capacity of the first cycle was recorded. 500 charge and discharge cycles were performed according to the above operations and a discharge capacity of the $500^{th}$ cycle was recorded.

Cycle capacity retention rate of the lithium-ion battery=(Discharge capacity at the $500^{th}$ cycle/Discharge capacity at the first cycle)×100%.

(4) Kinetic Performance Test

Five lithium-ion batteries prepared in the Examples and five lithium-ion batteries prepared in the Comparative Examples were taken, and then tested in a room temperature environment. First, the lithium-ion batteries were charged at a constant current of 0.5 C to an upper limit voltage of 4.3 V, and then charged at a constant voltage of 4.3 V until the current was lower than 0.05 C, and then discharged at a constant current with different rates (0.5 C, 2 C) until a final voltage was 3 V. Discharge capacities at different rates were recorded.

The kinetic performance of the lithium-ion battery was characterized by a ratio of a discharge capacity at a rate of 2 C of the lithium-ion battery to a discharge capacity at a rate of 0.5 C of the lithium-ion battery.

TABLE 2

Performance test results of Examples 1 to 29 and the Comparative Examples 1 to 7

|  | Volume swelling ratio ε | Hot box safety performance (h2 − h1) (min) | Capacity retention rate after cycling | 2 C/ 0.5 C |
|---|---|---|---|---|
| Example 1 | 14% | 53 | 78% | 70% |
| Example 2 | 12% | 56 | 80% | 72% |
| Example 3 | 10% | 60 | 83% | 75% |
| Example 4 | 9% | 64 | 85% | 78% |
| Example 5 | 7% | 68 | 88% | 80% |
| Example 6 | 5% | 72 | 90% | 78% |
| Example 7 | 10% | 75 | 85% | 75% |
| Example 8 | 15% | 49 | 79% | 71% |
| Example 9 | 28% | 54 | 68% | 78% |
| Example 10 | 11% | 60 | 85% | 80% |
| Example 11 | 12% | 58 | 87% | 82% |
| Example 12 | 13% | 55 | 89% | 84% |
| Example 13 | 14% | 44 | 90% | 86% |
| Example 14 | 15% | 35 | 91% | 88% |
| Example 15 | 8% | 68 | 75% | 45% |
| Example 16 | 17% | 21 | 94% | 82% |
| Example 17 | 9% | 65 | 85% | 78% |
| Example 18 | 10% | 64 | 86% | 77% |
| Example 19 | 8% | 63 | 85% | 79% |
| Example 20 | 9% | 64 | 84% | 78% |
| Example 21 | 7% | 67 | 82% | 72% |
| Example 22 | 6% | 69 | 81% | 70% |
| Example 23 | 8% | 65 | 83% | 75% |
| Example 24 | 8% | 66 | 82% | 74% |
| Example 25 | 7% | 69 | 89% | 82% |
| Example 26 | 5% | 70 | 90% | 80% |
| Example 27 | 16% | 59 | 87% | 75% |
| Example 28 | 12% | 65 | 92% | 82% |
| Example 29 | 6% | 72 | 94% | 80% |
| Comparative Example 1 | 64% | 19 | 95% | 98% |
| Comparative Example 2 | 6% | 80 | 54% | 50% |
| Comparative Example 3 | 16% | 47 | 76% | 63% |
| Comparative Example 4 | 34% | 54 | 64% | 79% |
| Comparative Example 5 | 45% | 43 | 53% | 56% |
| Comparative Example 6 | 48% | 38 | 42% | 37% |
| Comparative Example 7 | 16% | 35 | 85% | 80% |

It can be seen from the test results of Comparative Examples 1 to 6 and Examples 1 to 16 that after the nonaqueous electrolytes used mixed solvents formed by high oxidation potential solvents and carbonate solvents in combination with mixed lithium salts formed by $LiPF_6$ and $LiN(FSO_2)_2$, high-temperature storage performance and hot box safety performance of the lithium-ion batteries could be significantly improved, and the lithium-ion batteries also had good cycle performance and kinetic performance.

A possible reason is that the high oxidation potential solvents had advantages of high oxidation resistance and non-flammability. After being mixed with the carbonate solvents, the high oxidation potential solvents could overcome disadvantages of poor oxidation resistance, easy high-pressure decomposition and gas generation, a low flash point, easy combustion, and the like of conventional carbonate solvents, thereby significantly improving high-temperature storage performance and hot box safety performance of the lithium-ion batteries. However, although the high oxidation potential solvents had the advantages of high oxidation resistance and non-flammability, their viscosity was greater than that of the carbonate solvents. After the high oxidation potential solvents were added, overall viscosity of the nonaqueous electrolytes increased greatly, ion conduction became slow, electrical conductivity decreased, and cycle performance and kinetic performance of the lithium-ion batteries deteriorated significantly. After the mixed lithium salt formed by $LiPF_6$ and LiFSI was added, because LiFSI had advantages of moderate viscosity and a high degree of dissociation, and could facilitate ion conduction and improve electrical conductivity of the nonaqueous electrolyte, LiFSI could effectively make up for low electrical conductivity of the nonaqueous electrolyte caused by high viscosity of the high oxidation potential solvent, and help to obtain a lithium-ion battery with good cycle performance and kinetics performance. When the solvent of the nonaqueous electrolyte contained only a carbonate solvent, the nonaqueous electrolyte had poor oxidation resistance, was easy to decompose and generate gas under high pressure, had a low flash point, and was easy to combust, and the lithium-ion battery had quite poor high-temperature storage performance and hot box safety performance. When the solvent of the nonaqueous electrolyte contained only the high oxidation potential solvent, overall viscosity of the nonaqueous electrolyte was relatively large, resulting in low electrical conductivity. Consequently, cycle performance and kinetic performance of the lithium-ion battery significantly deteriorated. When only LiPF$_6$ was used as a lithium salt, overall viscosity of the nonaqueous electrolyte was relatively large, resulting in low electrical conductivity. Consequently, kinetic performance of the lithium-ion battery significantly deteriorated. In addition, thermal stability of LiPF$_6$ was moderate, and therefore LiPF$_6$ had limited improvement on high-temperature storage performance and hot box safety performance of the lithium-ion battery. When only LiFSI was used as a lithium salt, electrical conductivity of the nonaqueous electrolyte could be significantly improved, and kinetic performance of the lithium-ion battery was significantly improved, but a risk of aluminum foil corrosion was also high. Consequently, cycle performance of the lithium-ion battery deteriorated instead. Other lithium salts, such as LiN(CF$_3$SO$_2$)$_2$, had a high degree of dissociation, but their viscosity were also relatively high. Therefore, it had no obvious improvement effect on electrical conductivity of the nonaqueous electrolyte, and limited improvement on cycle performance and kinetic performance of the lithium-ion battery. Although LiCF$_3$SO$_3$ had high solubility in nonaqueous solvents, its degree of dissociation was not high. Therefore, it had no obvious improvement effect on electrical conductivity of the nonaqueous electrolyte, and limited improvement on cycle performance and kinetic performance of the lithium ion battery either.

It can be further seen from the test results of Examples 1 to 9 that when a relative percentage of LiFSI was relatively high, electrical conductivity of the nonaqueous electrolyte was significantly improved, and kinetic performance of the lithium-ion battery was significantly improved, but a risk of aluminum foil corrosion also increased, which was detrimental to cycle performance of the lithium-ion battery. When the relative percentage of LiPF$_6$ was relatively high, the effect made by LiFSI in improving kinetic performance and safety performance of the lithium-ion battery was limited. Therefore, in some embodiments, the weight ratio of LiPF$_6$ to LiFSI is 10:1 to 1:10.

It can be further seen from the test results of Examples 10 to 16 that, when a weight percentage of the high oxidation potential solvent was relatively low, the effect in overcoming the disadvantages of carbonate solvents such as poor oxidation resistance, easy high-pressure decomposition and gas generation, a low flash point, and easy combustion was not obvious. When the weight percentage of the high oxidation potential solvent was relatively high, overall viscosity of the nonaqueous electrolyte increased greatly but electrical conductivity reduced, which had greater impact on kinetic performance of the lithium-ion battery. Therefore, in some embodiments, based on a total weight of the nonaqueous solvent, the weight percentage of the high oxidation potential solvent is 10% to 60%.

It can be seen from the test results of Comparative Example 7 and Examples 17 to 24 that the high oxidation potential solvents that had not been fluorinated had poorer oxidation resistance and did not exhibit flame retardancy, so that the effect in improving high-temperature storage performance and hot box safety performance of the lithium-ion batteries was not desirable.

It can be also seen from the test results of Examples 17 to 24 that the high oxidation potential solvents of different structures also had some impact on performance of the lithium-ion batteries. The high oxidation potential solvent of a cyclic structure was characterized by higher viscosity and a higher dielectric constant, and the high oxidation potential solvent of a linear structure was characterized by lower viscosity and a lower dielectric constant. Therefore, in some embodiments, the high oxidation potential solvent includes both a high oxidation potential solvent of a linear structure and a high oxidation potential solvent of a cyclic structure. In some embodiments, the high oxidation potential solvent only includes a high oxidation potential solvent of a linear structure.

It can be seen from the test results of Example 4 and Examples 25 to 29 that after a film-forming additive, such as DTD, PS, VC, or FEC, was further added into the nonaqueous electrolyte including the high oxidation potential solvent, the carbonate solvent, and the mixed lithium salt formed by LiPF$_6$ and LiN(FSO$_2$)$_2$, comprehensive performance of the lithium-ion batteries was further improved. A possible reason is that the film-forming additive had some film-forming effect on both the positive electrode and the negative electrode, and the formed film had good stability, which inhibited continuous side reactions of the nonaqueous electrolyte during use of the battery. As such, impedance of the interface protective films on the positive electrode and negative electrode increased more slowly, and comprehensive performance of the lithium-ion battery was better.

In addition, among the above film-forming additives, DTD improved performance of the lithium-ion batteries more significantly. A possible reason is that although the high oxidation potential solvent had the advantages of high oxidation resistance and non-flammability, the high oxidation potential solvent had poor compatibility with the negative electrode and might have side reactions on the negative electrode. DTD might first form a stable interface protective film on the negative electrode, thereby suppressing side reactions of the high oxidation potential solvent on the negative electrode. In addition, DTD might generate lithium sulfate that structurally contained an alkoxy structure (—CH$_2$CH$_2$O—) in the process of film forming on the negative electrode. This could effectively adjust viscoelasticity of the interface protective film on the negative electrode, further improve kinetics of lithium ion transfer at the interface, and finally form a thin and dense interface protective film with good kinetics of lithium ion transfer on the negative electrode. In addition, DTD might also form a stable interface protective film on a surface of the positive electrode to further improve oxidation resistance of the nonaqueous electrolyte. Therefore, the addition of DTD could better improve cycle performance and kinetic performance of the lithium-ion battery, and might also improve high-temperature storage performance and hot box safety performance of the lithium-ion batteries to some extent.

Furthermore, when the nonaqueous electrolyte contained both DTD and FEC in the above film-forming additives, the performance of the lithium-ion batteries, especially the cycle performance, was further improved. A possible reason is that: FEC might be reduced on the negative electrode to form a stable interface protective film, thereby weakening reduction reactions of DTD on the negative electrode. This might help to further improve film-forming quality of DTD on a surface of the positive electrode, which further facilitated improvement of cycle performance of the lithium-ion batteries.

According to the disclosure and teaching of this specification, a person skilled in the art of this application may further make appropriate changes or modifications to the foregoing implementations. Therefore, this application is not limited to the foregoing disclosure and the described specific implementations, and some changes or modifications to this application shall also fall within the protection scope of the claims of this application. In addition, although some specific terms are used in the specification, these terms are used only for ease of description, and do not constitute any limitation on this application.

What is claimed is:

1. A nonaqueous electrolyte, comprising a nonaqueous solvent and a lithium salt, wherein
the lithium salt is a mixed lithium salt formed by $LiPF_6$ and $LiN(FSO_2)_2$, a weight ratio of $LiPF_6$ and $LiN(FSO_2)_2$ is 10:1 to 1:10;
the nonaqueous solvent comprises a carbonate solvent and a high oxidation potential solvent, wherein the carbonate solvent comprises a cyclic carbonate and a linear carbonate, wherein the high oxidation potential solvent comprises one or more of compounds of formula I and one or more compounds of formula II

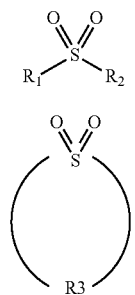

Formula I

Formula II in formula I, $R_1$ and $R_2$ are independently selected from unsubstituted, partially halogenated, or fully halogenated alkyl groups having 1 to 5 carbon atoms, and at least one of $R_1$ and $R_2$ is a partially halogenated or fully halogenated alkyl group having 1 to 5 carbon atoms; and
in formula II, $R_3$ is selected from partially halogenated or fully halogenated alkylidene groups having 1 to 6 carbon atoms, wherein
a halogen atom is selected from one or more of F, Cl, Br, and I,
wherein, based on a total weight of the high oxidation potential solvent, a weight of the compound represented by formula I is 30% or more, and a weight of the compound represented by formula II is 70% or less,
wherein based on a total weight of the nonaqueous solvent, a weight percentage of the high oxidation potential solvent is 20% to 60%, a weight percentage of the linear carbonate is 45% to 75%, and a weight percentage of the cyclic carbonate is 10% or less.

2. The nonaqueous electrolyte according to claim 1, wherein a weight ratio of $LiPF_6$ and $LiN(FSO_2)_2$ is 4:1 to 1:4.

3. The nonaqueous electrolyte according to claim 1, wherein
based on a total weight of the nonaqueous solvent, a weight percentage of the high oxidation potential solvent is 20% to 40%; and
based on the total weight of the nonaqueous solvent, a weight percentage of the carbonate solvent is 60% to 80%.

4. The nonaqueous electrolyte according to claim 1, wherein
the cyclic carbonate is selected from one or more of ethylene carbonate and propylene carbonate, and the linear carbonate is selected from one or more of ethyl methyl carbonate, methyl propyl carbonate, methyl isopropyl carbonate, methyl butyl carbonate, ethyl propyl carbonate, dimethyl carbonate, diethyl carbonate, dipropyl carbonate, and dibutyl carbonate.

5. The nonaqueous electrolyte according to claim 1, wherein
in formula I, $R_1$ and $R_2$ are independently selected from unsubstituted, partially fluorinated or fully fluorinated alkyl groups having 1 to 5 carbon atoms, and at least one of $R_1$ and $R_2$ is a partially fluorinated or fully fluorinated alkyl group having 1 to 5 carbon atoms; and
in formula II, $R_3$ is selected from partially fluorinated or fully fluorinated alkylidene groups having 1 to 6 carbon atoms.

6. The nonaqueous electrolyte according to claim 1, wherein
in formula I, $R_1$ and $R_2$ are independently selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ and $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, —$CF_2CF_2CH_3$, or —$CF_2CF_2CF_3$; and
in formula II, $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, and —$CH_2CH_2CH(CF_3)CH_2CHFCH_2$—.

7. The nonaqueous electrolyte according to claim 5, wherein the high oxidation potential solvent is selected from one or more of the following compounds:

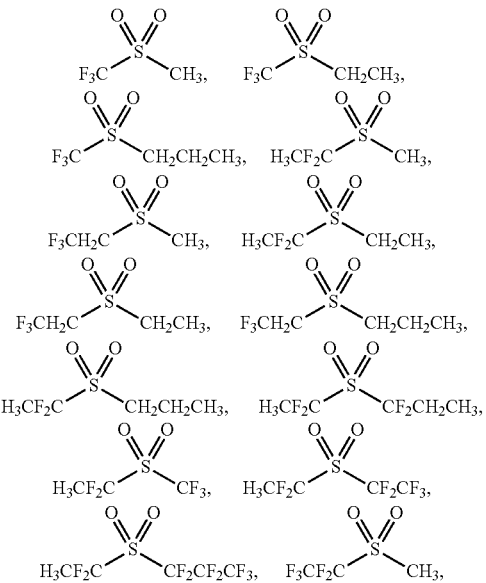

-continued

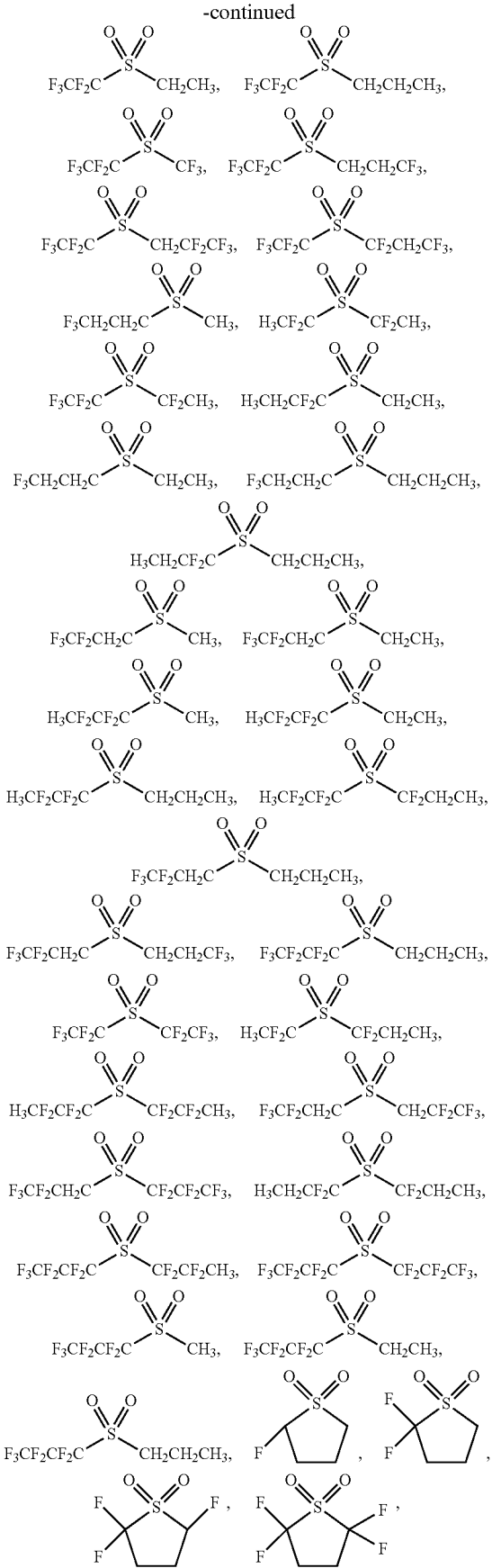

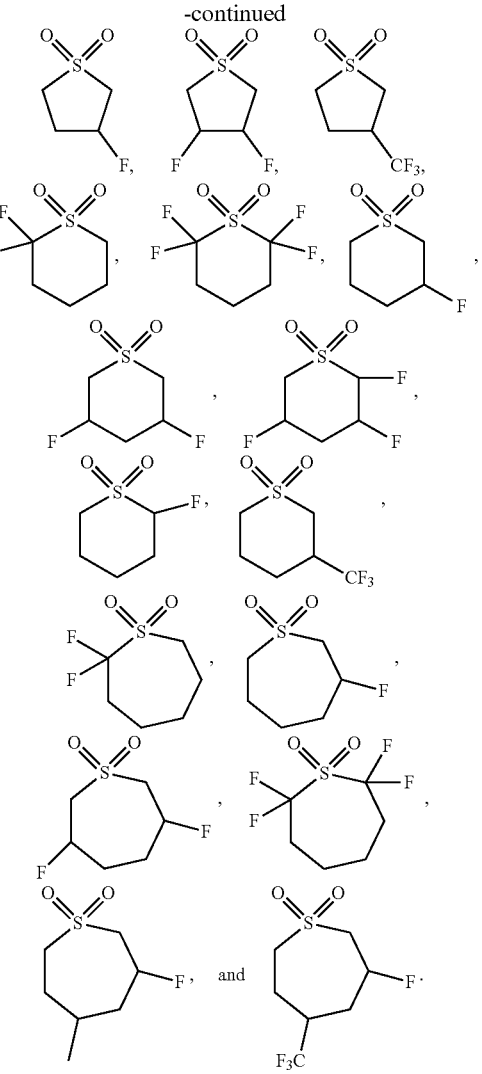

8. The nonaqueous electrolyte according to claim 1, wherein
the nonaqueous electrolyte further comprises a film-forming additive; and
the film-forming additive is selected from one or more of a cyclic carbonate compound with an unsaturated bond, a halogen-substituted cyclic carbonate compound, a sulfate compound, a sulfite compound, a sultone compound, a disulfonate compound, anitrile compound, an aromatic compound, an isocyanate compound, a phosphazene compound, a cyclic anhydride compound, a phosphite compound, a phosphate compound, a borate compound, and a carboxylate compound.

9. The nonaqueous electrolyte according to claim 8, wherein
based on the total weight of the nonaqueous electrolyte, a weight percentage of the film-forming additive is 0.1% to 5%.

10. The nonaqueous electrolyte according to claim 1, wherein
the nonaqueous electrolyte further comprises a film-forming additive; and
the film-forming additive is selected from one or more of 1,3-propane sultone, ethylene sulfate, fluoroethylene carbonate, difluoroethylene carbonate, vinylene carbonate, 1,3-propene sultone, adiponitrile, and succinonitrile.

11. The nonaqueous electrolyte according to claim 10, wherein
the film-forming additive comprises ethylene sulfate.

12. The nonaqueous electrolyte according to claim 10, wherein
the film-forming additive comprises ethylene sulfate and fluoroethylene carbonate.

13. A lithium-ion battery, comprising a positive electrode plate, a negative electrode plate, a separator, and the nonaqueous electrolyte according to claim 1.

14. The lithium-ion battery according to claim 13, wherein
the positive electrode plate comprises one or more of $Li_{1+x}Ni_aCo_bM'_{(1-a-b)}O_{2-c}Y_c$, and $Li_{1+y}Ni_mMn_nM''_{2-m-n}O_{4-p}Z_p$, wherein
−0.1≤x≤0.2, 0.6≤a≤1, 0≤b<1, 0≤(1−a−b)<1, 0≤c<1, M' is selected from one or more of Mn, Al, Mg, Zn, Ga, Ba, Fe, Cr, Sn, V, Sc, Ti, and Zr, and Y is selected from one or more of F, Cl, and Br; and
−0.1≤y≤0.2, 0.4≤m≤1.2, 0.8≤n≤1.6, 0≤(2−m−n)≤0.3, 0≤p≤1, M'' is selected from one or more of Al, Mg, Zn, Ga, Ba, Fe, Cr, Sn, V, Sc, Ti, and Zr, and Y is selected from one or more of F, Cl, and Br.

15. An apparatus, comprising the lithium-ion battery according to claim 13, wherein the lithium-ion battery is used as a power supply for the apparatus.

16. The apparatus according to claim 15, wherein the apparatus is one selected from the group consisting of a full electric vehicle, a hybrid electric vehicle, a plug-in hybrid electric vehicle, an electric bicycle, an electric scooter, an electric golf cart, an electric truck, an electric vessel, and an energy storage system.

17. A battery module comprising a plurality of lithium-ion batteries, wherein each one of the lithium-ion batteries comprises a positive electrode plate, a negative electrode plate, a separator, and the nonaqueous electrolyte according to claim 1.

18. The nonaqueous electrolyte according to claim 1, wherein
the weight of the cyclic carbonate is 3% to 8% based on the total weight of the nonaqueous solvent.

19. The nonaqueous electrolyte according to claim 1, wherein
a weight ratio of the linear carbonate to the cyclic carbonate is 15:1 to 3:1.

20. The nonaqueous electrolyte according to claim 1, wherein, based on a total weight of the high oxidation potential solvent, the weight of the compound of formula I is 60% to 70%, and the weight of the compound of formula II is 30% to 40%.

* * * * *